United States Patent [19]
Fuji

[11] Patent Number: 5,715,217
[45] Date of Patent: Feb. 3, 1998

[54] METHOD AND APPARATUS FOR TRACKING CORRECTION AND OPTICAL DISK FOR USE THEREIN

[75] Inventor: Hiroshi Fuji, Soraku-gun, Japan

[73] Assignee: Sharp Kabushiki Kaisha, Osaka, Japan

[21] Appl. No.: 637,545

[22] Filed: Apr. 25, 1996

[30] Foreign Application Priority Data

May 30, 1995 [JP] Japan ................... 7-132244

[51] Int. Cl.$^6$ ................................. G11B 7/095
[52] U.S. Cl. ...................... 369/44.26; 369/44.29; 369/44.34; 369/275.4
[58] Field of Search ............... 369/44.13, 44.26, 369/44.34, 275.4, 44.29, 44.35, 44.25, 54

[56] References Cited

U.S. PATENT DOCUMENTS

| | | | |
|---|---|---|---|
| 5,185,732 | 2/1993 | Ogawa et al. | 369/275.4 |
| 5,315,567 | 5/1994 | Fuji et al. | |
| 5,383,169 | 1/1995 | Shinoda et al. | 369/44.13 |
| 5,406,545 | 4/1995 | Kadowaki | 369/44.34 |
| 5,459,706 | 10/1995 | Ogawa et al. | 369/44.13 |

FOREIGN PATENT DOCUMENTS 314538  11/1993  Japan.

*Primary Examiner*—Thang V. Tran
*Attorney, Agent, or Firm*—David G. Conlin; David D. Lowry

[57] ABSTRACT

An optical disk is provided with grooves, which have first and second regions. A first side wall of a groove in the first region is wabbled, while a second side wall of the groove, which is opposite to the wabbled side wall in the first region, is wabbled in the second region. The tracking of a light beam is carried out with respect to the first and second regions, so that first amplitude of a first wabble signal and second amplitude of a second wabble signal, which are contained in a tracking error signal, are obtained. The first and second amplitude are compared, and a correction signal which varies depending on the difference in the amplitude is given to the tracking error signal, so that the first and the second amplitude are corrected to be substantially equal. Thus, it is possible to correct a deviation caused by an error in conditioning optical elements, an aberration of optical elements, and a change due to aging.

21 Claims, 13 Drawing Sheets

FIG.10
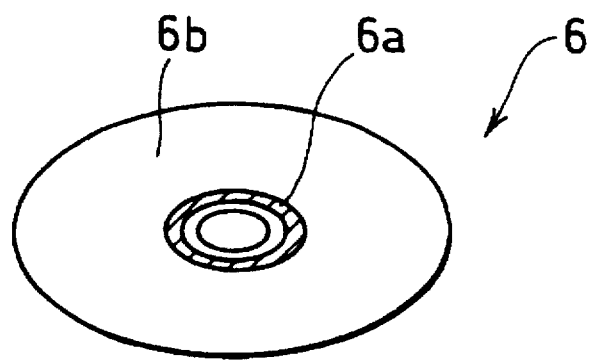
FIG.11(a)             FIG.11(b)
          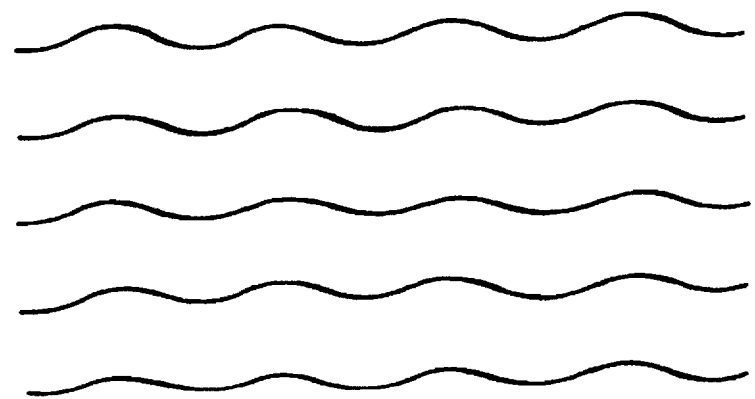

F I G.15(a) 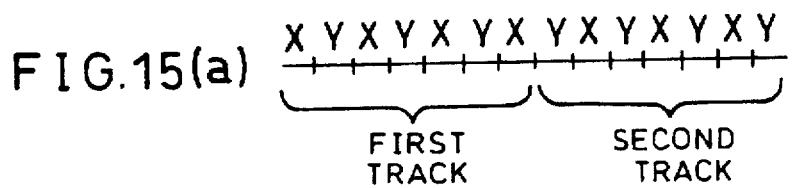
F I G.15(b) 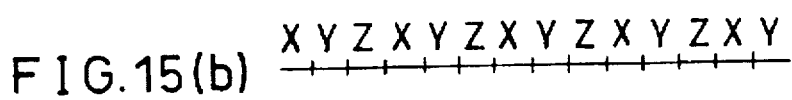

METHOD AND APPARATUS FOR TRACKING CORRECTION AND OPTICAL DISK FOR USE THEREIN

FIELD OF THE INVENTION

The present invention relates to an optical disk having tracking-use grooves whose side walls are wabbled, and to methods and apparatuses for carrying out a tracking correction of a light beam with respect to such an optical disk.

BACKGROUND OF THE INVENTION

Lands and grooves between the lands are configured on some optical disks, and the tracking of a light beam with respect to such an optical disk is performed by making effective use of such a specific configuration. Both side walls, or one side wall, of the groove to be tracked are wabbled in a radial direction in the conventional optical disk, so that information, such as address information and information on the control of rotation, is recorded in accordance with such wabbled walls of the groove. The tracking is carried out in accordance with such wabbled walls of the groove.

For example, Japanese Publication for Unexamined Patent Application No.5-314538/1993 proposes an optical disk wherein only one side wall of a groove is wabbled so that address information is recorded. With such an arrangement, a frequency of a wabble signal is set so as not to be coincident with a frequency band for a tracking servo. Only wabbled frequency components of a wabble signal frequency are extracted from a tracking error signal by a band-pass filter, so that address information of a track which is being scanned by a light beam is reproduced.

Japanese Publication for Unexamined Patent Application No.4-184718/1992 proposes an optical disk device for carrying out soft-formatting for use with an optical disk wherein a part of a groove has both side walls wabbled. With such an arrangement, the soft-formatting is carried out on the basis of a wabble signal, which is contained in the tracking error signal.

Incidentally, during the tracking, a light beam sometimes deviates from the center of a target track to a certain extent, due to an electric offset which occurs in a servo circuit. There is a method for correcting a tracking error signal so as to eliminate such a deviation. If the well-known "push-pull" amplification method is adopted, the tracking error signal is obtained by the following procedure, as shown in FIG. 16.

During a tracking operation, a light beam is projected from a semiconductor laser 103 onto an optical disk 106 through a beam splitter 104 and an objective lens 105. The light beam reflected from the optical disk 106 is again transmitted through the objective lens 105, reflected by the beam splitter 104, and directed toward a two-division photodetector 107. Two signals detected by the two-division photodetector 107 are differential-amplified by a differential amplifier 108, and a tracking error signal is generated.

The light beam from the semiconductor laser 103 is quenched during correcting the tracking error signal, so that an electric offset contained in the tracking error signal is eliminated. To be more detailed, by using an adder 111, an offset voltage which is adjusted by a variable resistor 110 is added to an output signal of the differential amplifier 108, so that the offset voltage of the tracking error signal becomes zero.

However, with such a conventional tracking correction method, corrected is exclusively an electric offset occurred in a tracking servo circuit, and it is difficult to correct the tracking error signal when an error in conditioning optical parts, an aberration of optical parts, and a change due to aging of the optical elements occur. In addition, since the light beam is off the center of a target track due to the above-mentioned deviation during the tracking operation, a wabble signal contained in the tracking error signal also changes, thereby causing an error in the reproduction of address information. Further, there is another problem that an error appears in reproduced information, since the information is recorded while the light beam deviates from the center of the target track.

SUMMARY OF THE INVENTION

The object of the present invention is to provide a tracking correction method and apparatus, for correcting a tracking deviation caused by an error in conditioning optical parts and an aberration of optical elements, and a change due to aging, and to provide an optical disk for use with such method and apparatus.

To achieve the object, a light beam is projected onto a track of an optical recording medium, which has first and second regions. The first region of the track has a first side wall of a groove which is wabbled at a frequency not falling within a tracking servo frequency band, while the second region of the track has a second side wall of a groove which is wabbled at a frequency not falling within the tracking servo frequency band. Note that the first side wall is opposite to the second side wall. A method for carrying out a tracking correction so that the beam, projected onto such a track, does not deviated from the track is comprised of the steps of (1) obtaining first amplitude of a wabble signal which is obtained in accordance with a tracking of the light beam with respect to the first region, (2) obtaining second amplitude of a wabble signal which is in accordance with a tracking of the light beam with respect to the second region, and (3) producing a correction signal, in accordance with comparison of the first and the second amplitude, so that the first amplitude becomes substantially equal to the second amplitude.

With the method, either a tracking error signal or a total signal is obtained by carrying out the tracking of the light beam projected on the first region. Here, if the light beam, for example, tracks off-center to the wabbled side wall, the light beam is significantly affected by the wabbled side wall. Accordingly, the amplitude of the wabble signal in the tracking error signal or the total signal is great in comparison with that when the light beam tracks the center of a groove. In short, the first amplitude of the wabble signal derived from the first region becomes greater than a desired value.

When the tracking of the light beam is carried out with respect to the second region, the light beam tracks off-center to the non-wabbled side wall, because the wabbled side wall is opposite to that in the first region. Since the light beam is farther from the wabbled side wall, it is hardly affected by the wabbled side wall. Accordingly, the second amplitude of the wabble signal derived from the second region is smaller than the desired value.

The comparison between the first and second amplitude is conducted and a correction signal which varies depending on the amplitude difference is supplied to the wabble signal so that the first and second amplitude become substantially equal, thereby enabling to correct the tracking. This causes the light beam to fall on the center of the groove in the tracking direction.

In addition, since the frequency band of the wabble signal is different from a tracking servo frequency band, the tracking is not affected by the wabble signal, i.e., it is possible to correct the deviation of the light beam from the groove center caused by an conditioning error and an aberration of optical elements, and a change due to aging.

Also to achieve the above object, a light beam is projected onto a track of an optical recording medium which has first and second regions. The first region of the track has a first side wall of a groove which is wabbled at a frequency not falling within a tracking servo frequency band, while the second region has a second side wall of a groove which is wabbled at a frequency not falling within the tracking servo frequency band. Note that the first side wall is opposite to the second side wall. An apparatus for carrying out a tracking correction so that the light beam projected on such a track does not deviate from the center of the track is comprised of (1) signal detector for outputting a tracking error signal during tracking of a light beam with respect to the optical recording medium, (2) amplitude detector for detecting amplitude of the wabble signal in the tracking error signal, (3) comparator for comparing first amplitude of the wabble signal derived from the first region and second amplitude of the wabble signal derived from the second region, and (4) corrector for correcting the tracking error signal in accordance with a compared result so that the first amplitude becomes substantially equal to the second amplitude.

With the above arrangement, when a light beam tracks the first region of an optical recording medium, a tracking error signal is outputted by the signal detector and is sent to the amplitude detector. Then, the first amplitude of a wabble signal in the tracking error signal is detected by the amplitude detector, and is send to the comparator.

A second amplitude derived from the second region is sent to the comparator in the same manner as is the case with the first amplitude. The first and the second amplitude are compared by the comparator. Then, based on the output from the comparator, the tracking error signal is corrected by the corrector so that the first and second amplitude are substantially equal.

Thus, the light beam is made to fall on the center of a groove in the tracking direction. Note that there is another arrangement wherein all received light amount is summed up and converted into an electric signal which is outputted as a total signal. The total signal is used instead of the tracking error signal so as to obtain a wabble signal. The same effects as mentioned above are obtained with such an arrangement.

Further, to achieve the above object, an optical disk of the present invention includes first and second regions. The first region has a first side wall of a groove which is wabbled at a frequency not falling within a tracking servo frequency band, while the second region has a second side wall of a groove which is wabbled at a frequency not falling within the tracking servo frequency band. Note that the first side wall is opposite to the second side wall.

With the arrangement, the wabbled side wall in the first region is opposite to that in the second region. Therefore, if the light beam performs the tracking off the center of a groove in the tracking direction, the amplitude of the wabble signals in either the tracking error signal or the total signal are different in the respective first and second regions, thereby enabling the tracking correction based on the detected amplitude. Note that since the frequency band of the wabble signal is different from a tracking servo frequency band, the tracking is not affected by the wabble signal.

Moreover, since the tracks composed of such grooves are provided on the optical disk in a spiral form or in a concentric form, the first and the second regions may be provided on one track without interruptions. Accordingly, a track access operation is unnecessary and the tracking correction operation can be carried out quickly.

For a fuller understanding of the nature and advantages of the invention, reference should be made to the ensuing detailed description taken in conjunction with the accompanying drawings.

BRIEF DESCRIPTION OF THE DRAWINGS

FIG. 10 is a view illustrating an arrangement wherein the above-mentioned optical recording medium has an optical disk having a tracking correction region.

FIG. 11(a) is a cross sectional view illustrating how lands and grooves are provided in a data recording region of the optical disk.

FIG. 11(b) is a plan view illustrating the data recording region.

FIG. 15(a) is an explanatory view illustrating how first and second regions are provided on an optical disk in the third embodiment of the present invention.

FIG. 15(b) is an explanatory view illustrating another arrangement of first and second regions.

DESCRIPTION OF THE PREFERRED EMBODIMENTS

[First Embodiment]

The following description will explain the first embodiment of the present invention, referring to FIGS. 1 through 14. Note that a tracking correction method of the present embodiment is for correcting a tracking error signal which is obtained, for example, in accordance with the "push-pull" amplification method.

Figure 1:
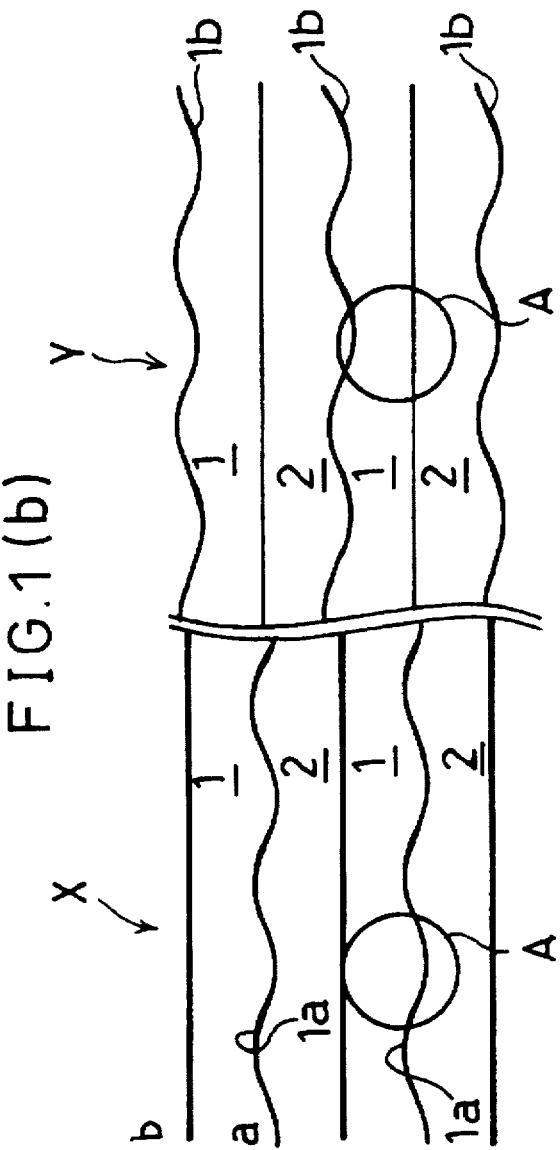
FIG. 1(a) is a cross sectional view illustrating an optical recording medium for use in a tracking correction method of the first embodiment in accordance with the present invention.
FIG. 1(b) is a plan view illustrating two types of grooves on the optical recording medium.
FIG. 1(c) is an explanatory view illustrating amplitude of a wabble signal contained in a tracking error signal of the optical recording medium.

An optical recording medium of the present embodiment, as shown in FIGS. 1 (a) and 1 (b), has grooves 1 and lands 2. The groove 1 is provided between the two lands 2. There are provided a first region X and a second region Y, so that a tracking correction is conducted in accordance with the respective regions. Wabbled in the first region X is a side wall 1a on the lower side of the groove 1 in FIG. 1(a), while wabbled in the second region Y is a side wall 1b on the upper side of the groove 1 in FIG. 1(b). In other words, the wabbled side walls in the respective first and the second regions X and Y are opposite to each other.

Since each groove 1 and each land 2 are adjacent to each other, the wabbled side wall 1a is on the upper side of the land 2 in the first region X, while the wabbled side wall 1b is on the lower side of the land 2 in the second region Y.

Note that although the grooves 1 and the lands 2 in FIGS. 1 (a) and (b) are two each for the convenience sake, the numbers of the respective grooves and lands are not necessarily as such. Also, the grooves 1 and the lands 2 are formed on an optical recording medium such as an optical disk, an optical card, and an optical tape.

The following description will discuss a tracking correction method for use with such an optical recording medium. As shown in FIG. 1(b), here discussed is a case where the tracking is carried out while a light beam A, projected from the optical head onto the first region X, deviates from the center of a target track in a direction orthogonal to the light beam A's travelling direction. It is assumed that the deviation is downwards in the figure. Note that the track center indicates the average center between the side walls of the groove 1. Also, the travelling direction of the light beam A indicates the direction which the light beam A moves with respect to the optical recording medium.

In such a case, the light beam A is significantly affected by the wabbled side wall 1a when tracking in the first region X, since the light beam A is closer to the wabbled side wall 1a. Accordingly, a wabble signal in a tracking error signal E (or a total signal L, as will be mentioned below) which is varied depending on the light beam A's reflected light from the optical recording medium (or transmitted light transmitted through the optical recording medium), shows a great amplitude $V_1$ (the first amplitude), as seen in the wabble signal $E_1$ in FIG. 1(c). In contrast, the light beam A is hardly affected by the wabbled side wall 1b when tracking in the second region Y, since the light beam A is farther from the wabbled side wall 1b. Therefore, the wabble signal in the tracking error signal E shows a small amplitude $V_2$ (the second amplitude), as seen in the wabble signal $E_2$.

Note that in a reverse case, that is, a case where the tracking is carried out while the light beam A deviates upwards from the center of the groove 1 in FIG. 1(b), the wabble signal amplitude is small in the first region X whereas great in the second region Y. In addition, when the light beam A tracks the center of the groove 1, the amplitude in the respective first and second regions X and Y are substantially equal, as seen in the wabble signal E' in Figure (c).

Here, note that the frequency band of the wabble signal is set so as not to be coincident with the tracking servo frequency band. Since a tracking operation is not affected by the wabble signal, it is possible to detect the above-mentioned deviation of the light beam A from the track center according to the wabble signal. In other words, such a deviation of the light beam A from the center of the groove 1 can be eliminated by correcting the tracking error signal E so that the amplitude of the wabble signal in the first region X is substantially equal to that of the second region Y, as shown by the wabble signal E'. Thus, the tracking correction is carried out so that the center of the light beam A falls on the center of the groove 1 in the tracking direction.

Figure 4:
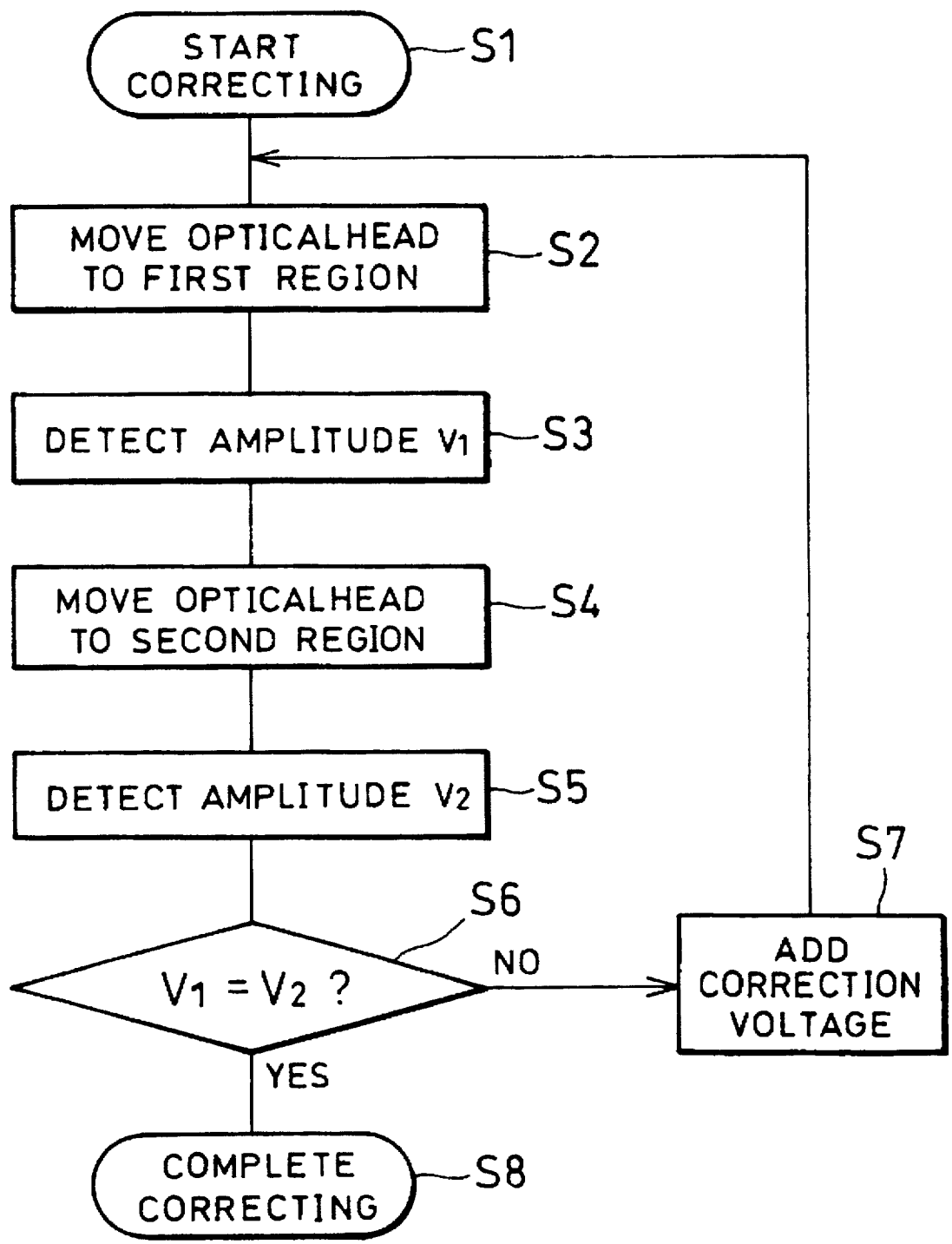
FIG. 4 is a flow chart illustrating the tracking correction method.
Figure 5:
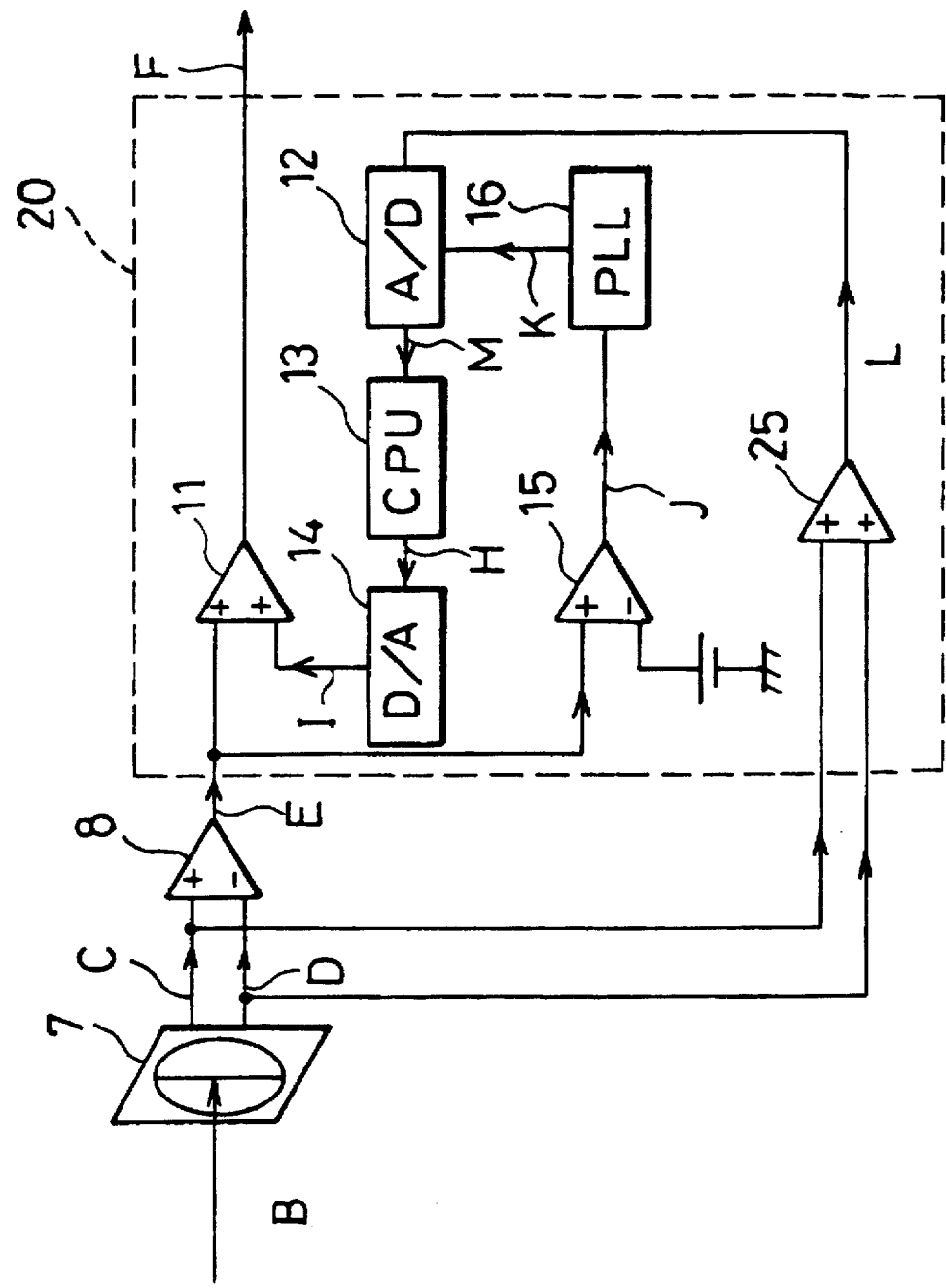
FIG. 5 is a view illustrating another arrangement of the tracking correction apparatus.
Figure 6:
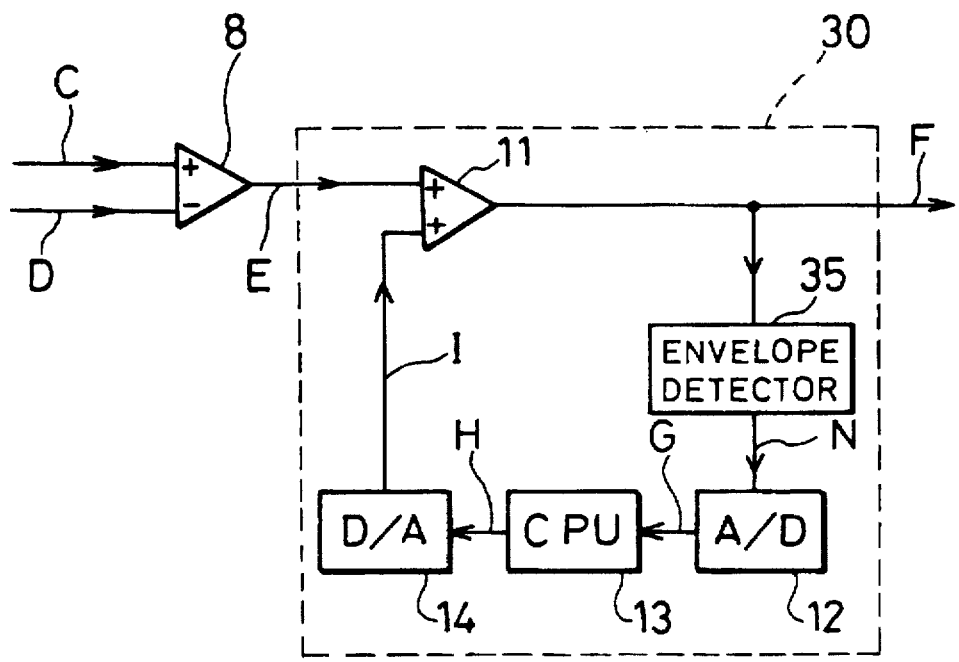
FIG. 6 is a view illustrating another arrangement of the tracking correction apparatus.

The following description will explain a detailed process of such a correcting operation, referring to FIGS. 1(c) and 4. When the tracking operation is commenced (S1), the optical head is moved to the first region X (S2), and the amplitude $V_1$ of a wabble signal $E_1$ contained in the tracking error signal E is detected (S3). Then, the optical head is moved to the second region Y (S4), and the amplitude $V_2$ of the wabble signal $E_2$ contained in the tracking error signal E is detected (S5). Comparison between the amplitude $V_1$ and $V_2$ of the respective wabble signals is conducted so as to judge whether the respective amplitude are substantially equal or not (S6). If it is judged in S6 that the amplitude $V_1$ and $V_2$ are not substantially equal, a correction voltage is added to the tracking error signal E and the flow goes back to the start of the correcting operation (S7). On the other hand, if it is judged in S6 that the amplitude $V_1$ and $V_2$ are substantially equal, the correcting operation ends (S8).

Thus, the correcting operation is repeated until the amplitude of the wabble signals in the respective first and second regions X and Y are substantially equal, thereby gradually correcting the tracking position of the light beam A to the center of a target groove.

The following description will depict an example wherein an optical disk as the optical recording medium is employed. As shown in FIG. 10, an optical disk 6 has a tracking correction region 6a and a data recording region 6b for recording data, the two regions sharing no part. Tracks in the two regions are provided either in a concentric form or in a spiral form.

A side wall of a groove in the data recording region 6b is wabbled in a radial direction of the optical disk 6 in accordance with address information, as in the first and the second regions X and Y. Therefore, the address information is obtained by means of a wabble signal. Note that the data recording region 6b is not restricted to the foregoing case. For example, the data recording region 6b may be configured so that the side walls of the track are not wabbled, or the side walls of a track are wabbled as shown in FIG. 11.

Figure 12:
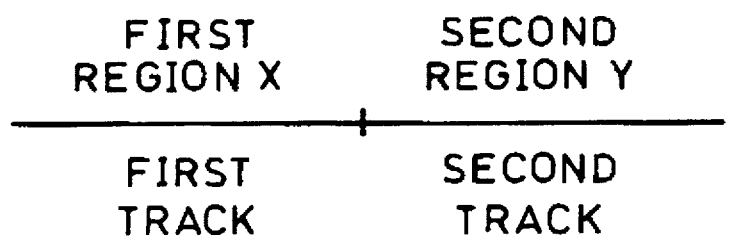
FIG. 12 is an explanatory view illustrating how first and second regions are provided on the optical disk.

The tracking correction region 6a is a part of the tracks of the optical disk 6, on which the first and second regions X and Y are provided. Let us assume that one track is defined as the track which corresponds to one rotation of the optical disk. As shown in FIG. 12, for example, the tracking correction region 6a is composed of two independent tracks, i.e., the first track forming the first region X and the second track forming the second region Y.

In such a case, first of all, amplitude of the wabble signal in the first region X is detected on the first track, and secondly amplitude of the wabble signal in the second region Y is detected on the second track. The tracking correcting operation is ended if the two amplitude are substantially equal, i.e., the difference is 0 or the ratio is 1:1, whereas if they are not equal, a track jump is carried out onto the first track so that the tracking correction operation is repeated.

FIG. 12 means that the first track starts at the left end of the line and ends at around a mid-point in the figure, and the second track starts at around the mid-point and ends at the right end. This means that the first track is tracked during the first rotation of the optical disk, then the second track is tracked during the second rotation.

Figure 13:
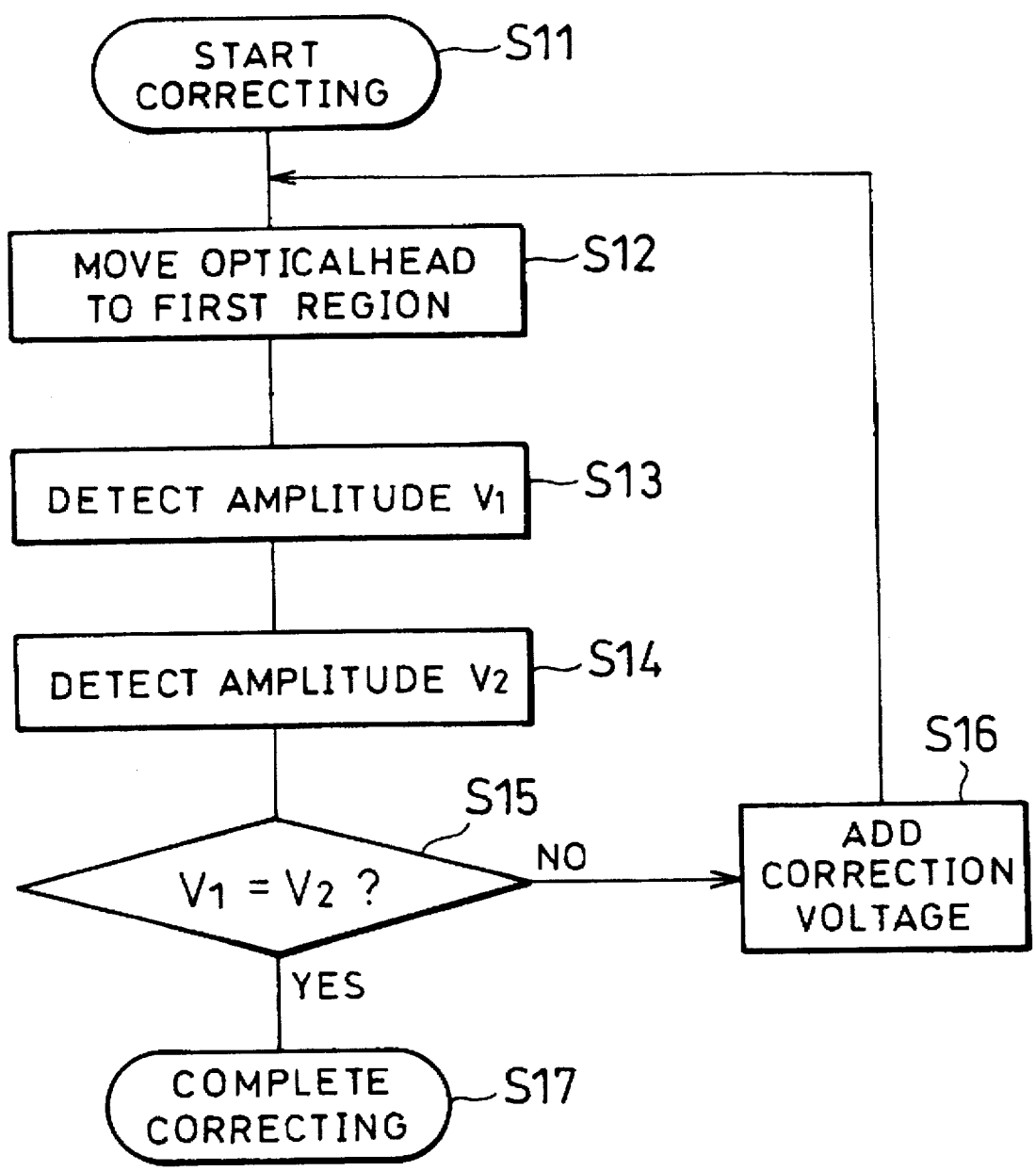
FIG. 13 is a flow chart illustrating a tracking correction operation in case where the optical disk is employed.

Such a tracking correction is explained in the following description in reference with a flow chart in FIG. 13. When the tracking correction is started (S11), an optical head is moved onto the tracking correction region 6a (S12). Next, an amplitude $V_1$ of the wabble signal $E_1$ contained in the tracking error signal E is detected (S13). Then, the amplitude $V_2$ of the wabble signal $E_2$ contained in the tracking error signal E are detected (S14). Comparison between the amplitude $V_1$ and $V_2$ of the respective wabble signals is carried out to judge whether they are substantially equal or not (S15). If it is judged in S15 that the amplitude are not equal, a correction voltage is added to the tracking error signal E and the flow goes back to the start of the correcting operation (S16). On the other hand, if it is judged in S15 that the two amplitude are substantially equal, the correcting operation ends (S17).

Thus, the correcting operation is repeated until the amplitude of the wabble signals in the respective first and second regions X and Y become substantially equal, thereby gradually correcting the tracking position of the light beam A to the center of a target groove 1. Since the tracking operation is not undertaken in the data recording region 6b, it doesn't affect the recording and reproduction of data. Thus, the tracking correction is performed without causing a data error in the data recording region 6b.

Further, on an optical recording medium which is employed as the optical disk 6, tracks are provided in a concentric form or in a spiral form. Accordingly, it is possible to provide the first and the second regions X and Y on a single track without interruption. This enables a quick tracking correction operation, as no track access operation is required.

Figure 2:
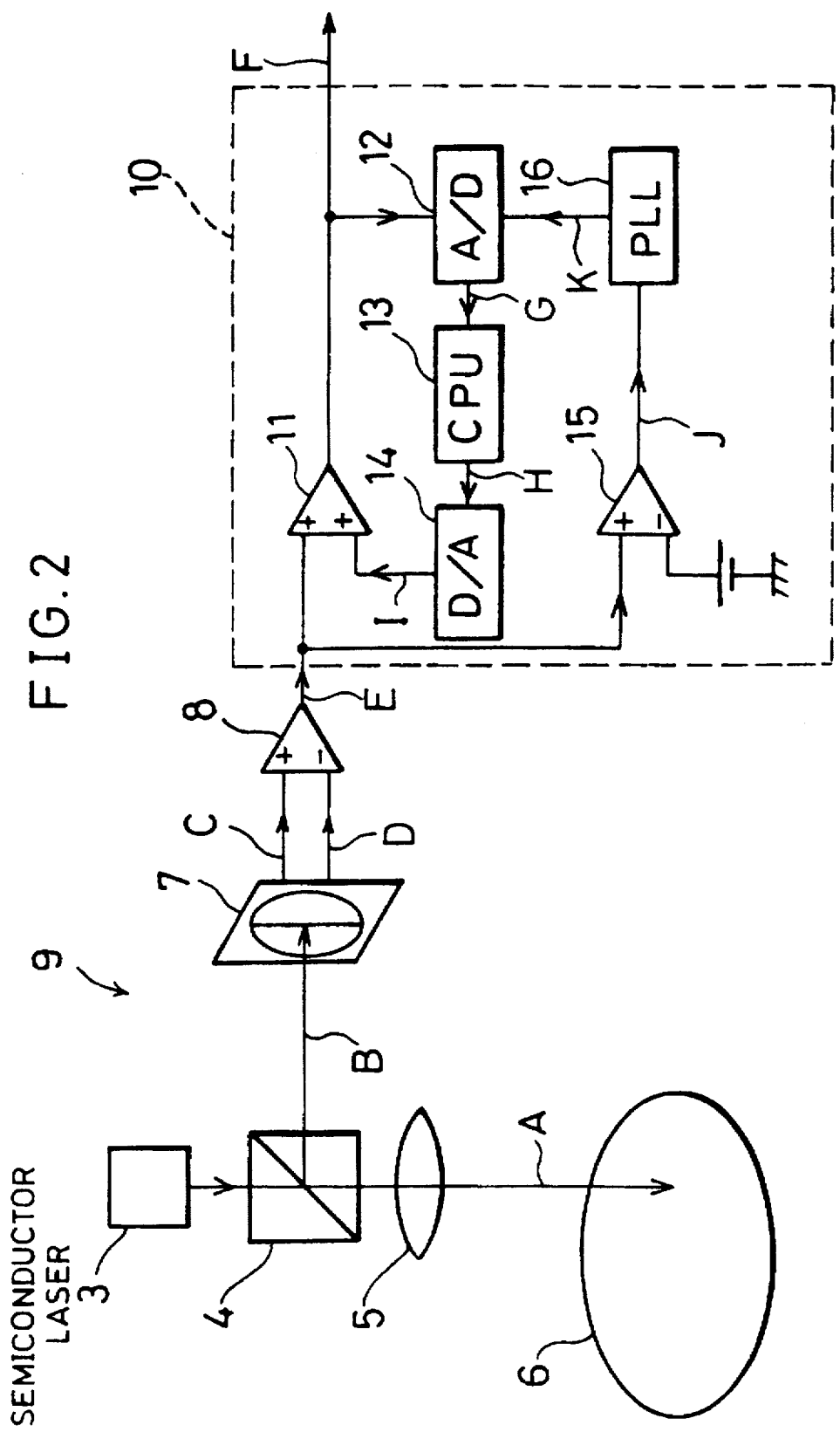
FIG. 2 is a view illustrating an arrangement of a tracking correction apparatus for carrying out the tracking correction method.

The following description will discuss a tracking correction apparatus for such a tracking correction as is mentioned above. As shown in FIG. 2, a tracking correction apparatus 10 is connected to an optical head 9 for projecting a light beam A on the optical disk 6. The optical head 9 is composed of a semiconductor laser 3, a beam splitter 4, an objective lens 5, a two-division photodetector 7, and a differential amplifier 8 (signal detecting means).

The semiconductor laser 3 projects the light beam A, and the beam splitter 4 transmits the projected light beam A while reflects to the two-division photodetector 7 a reflected light B which is reflected by the optical disk 6. The objective lens 5 converges the light beam A on the optical disk 6. Output terminals of the two-division photodetector 7 are respectively connected to positive and negative input terminals of the differential amplifier 8, and converts the reflected light B into detection signals C and D as outputs of the two-division photodetector 7. The differential amplifier 8 is connected to a tracking correction apparatus 10.

The tracking correction apparatus 10 is composed of an A/D converter 12 as amplitude detecting means, a comparator 15, a PLL (phase locked loop) circuit 16, a CPU (central processing unit) 13 as comparing means, a D/A converter 14 as correcting means, and an adder 11. An output terminal of the differential amplifier 8 is connected with one of input terminals of the adder 11. An output terminal of the adder 11 is connected to the input terminals of the A/D converter 12. An output from the A/D converter 12 is sent to the CPU 13, and an output from the CPU is sent to the D/A converter 14.

The output terminal of the differential amplifier 8 is connected to the adder 11, as mentioned above, while connected with a positive terminal of the comparator 15 as well. A negative terminal of the comparator 15 is earthed through a power supply. An output terminal of the comparator 15 is connected to the side of the PLL circuit 16, and an output from the PLL circuit 16 is into the A/D converter 12.

With such an arrangement, the light beam A emitted from the semiconductor laser 3 is converged on the optical disk 6 through the beam splitter 4 and the objective lens 5. The light beam A, reflected by the optical disk 6 and becoming the reflected light B, again transmits the objective lens 5. The beam splitter 4 changes the optical path of the detected light B so that the reflected light B is directed to the two-division photodetector 7. The reflected light B is converted by the two-division photodetector 7 into electric signals, which are detection signals C and D. The detection signal C is sent to the positive input terminal of the differential amplifier 8, while the detection signal D to the negative input terminal. The signals C and D are differential-amplified by the differential amplifier 8 so that the tracking error signal E is obtained.

The tracking correction apparatus 10 outputs a corrected tracking error signal F in response to the tracking error signal E. To be more specific, the tracking error signal E is first sent to one of the input terminals of the adder 11. The wabble signal contained in the output analog signal of the adder 11 is converted into a digital signal G by the A/D converter 12 in synchronization with a timing clock K (later described), then the digital signal G is sent to a digital arithmetic unit such as the CPU 13. The CPU 13 compares the amplitude $V_1$ of the wabble signal $E_1$ in the first region X and the amplitude $V_2$ of the wabble signal $E_2$ in the second region Y. The CPU 13 determines a correction signal H according to the difference or ratio between the amplitude $V_1$ and $V_2$, and the correction signal H is sent to the D/A converter 14, where the correction signal H is converted again into a correction signal I in an analog form. The correction signal I is sent to the other input terminal of the adder 11 where the correction signal I is added to the tracking error signal E.

Thus, such a feedback system enables tracking servo, wherein the corrected tracking error signal F is determined in accordance with the tracking error signal E, and the corrected tracking error signal F is fed back to an objective lens driving actuator (not shown).

The tracking error signal E is sent to the comparator 15, as well as to the adder 11 as mentioned above. The tracking error signal E is compared with a threshold voltage, and the tracking error signal E is converted into a binary signal J which is sent to the PLL circuit 16. The timing clock K synchronizing with the wabble signal is generated by the PLL circuit 16, and is sent to the A/D converter 12.

Figure 3:
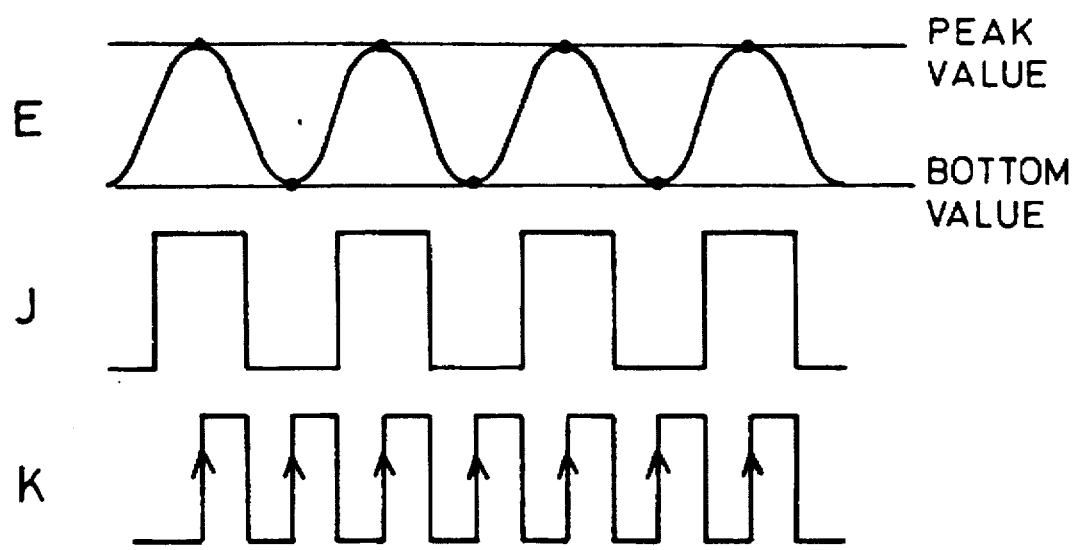
FIG. 3 is a timing chart of the tracking correction apparatus.

The following description will explain the timing clock K, referring to FIG. 3. As mentioned above, the tracking error signal E in the analog form is converted into a binary signal by the comparator 15, so that the binary signal J is obtained. The binary signal J is sent to the PLL circuit 16, where generated is the timing clock K synchronizing with the binary signal J and having a cycle half of that of the binary signal J. When the tracking error signal E is converted into a digital signal by the A/D converter 12 in accordance with each rising edge of the timing clock K, peaks and bottoms of the wabble signal are obtained. Thus, the amplitude of the wabble signal is obtained.

As has been described above, the tracking correction operation is realized by the tracking correction apparatus 10 having a simple circuit structure.

Figure 14:
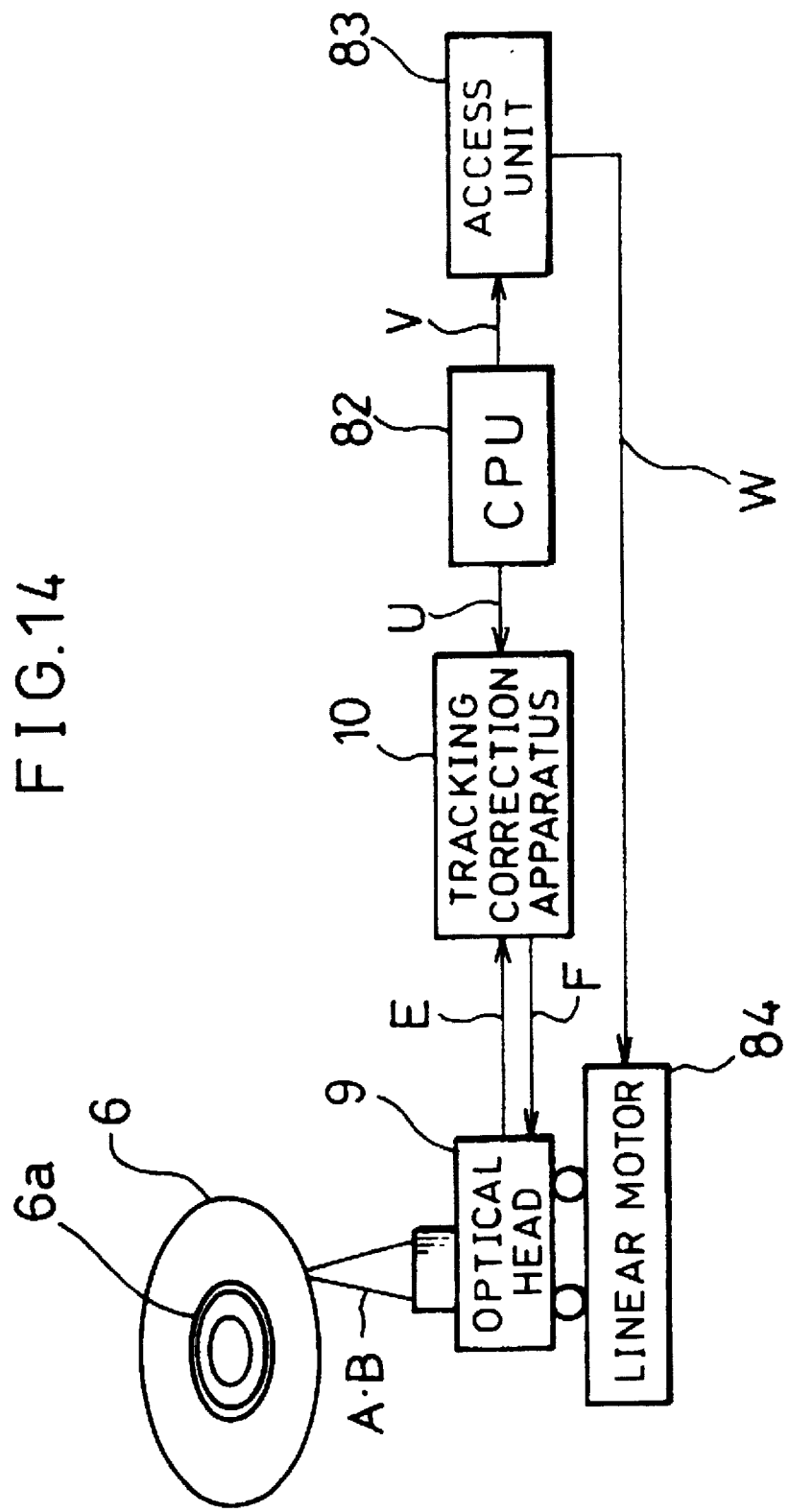
FIG. 14 is a view illustrating an arrangement of moving means for moving an optical head.
Figure 16:
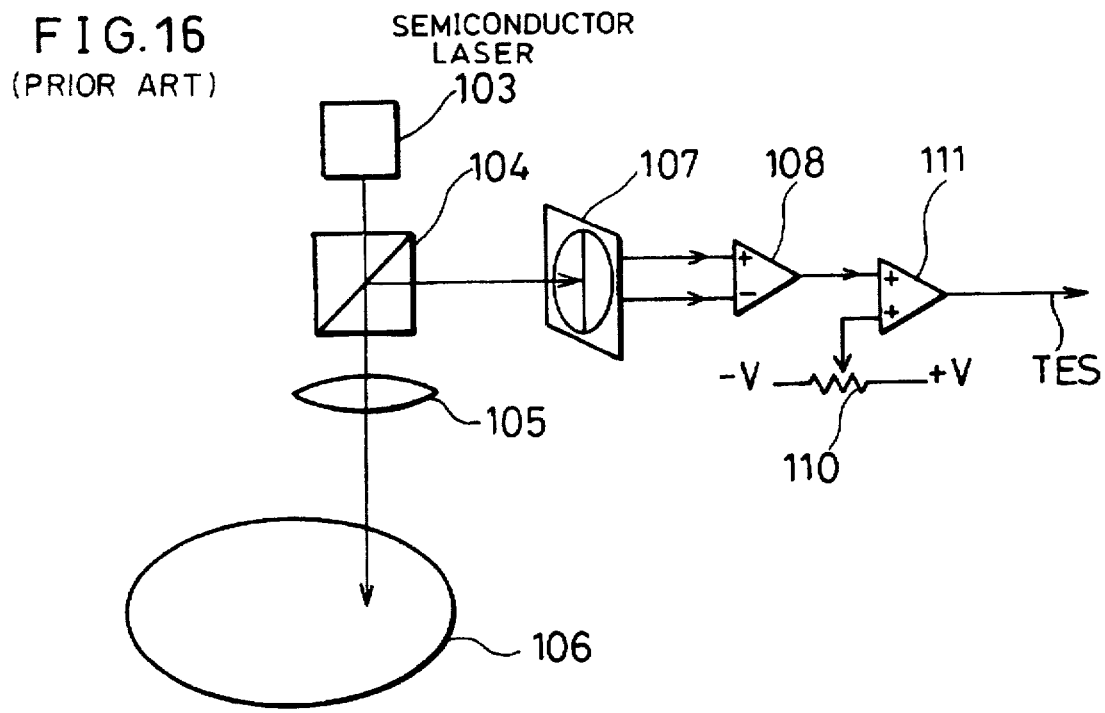
FIG. 16 is a view illustrating an arrangement of a conventional tracking correction apparatus.

The following description will discuss a method for moving the optical head 9, referring to FIG. 14. The optical head 9 is moved by the tracking correction apparatus 10, a CPU 82, an access unit 83, and a linear motor 84.

An access signal V is sent from the CPU 82 to the accessing unit 83. A driving signal W is sent from the accessing unit 83 to the linear motor 84 in response to the access signal V, thereby causing the optical head 9 to move so that the light beam A from the optical head 9 is projected on the tracking correction region 6a on the optical disk 6. Note that the optical head 9 moves in the radial direction of the optical disk 6.

Simultaneously a correcting command signal U is supplied by the CPU 82 to the tracking correction apparatus 10, thereby causing to perform a correcting operation for the optical head 9. Specifically, as has been mentioned above, the light beam A from the optical head 9 is converged on the optical disk 6, and is reflected by the optical disk 6, thereby becoming the reflected light B, which is received by a detector provided with the light head 9. In response to a detection signal from the detector, a tracking error signal E is detected, and is sent to the tracking correction apparatus 10. Then, the tracking error signal E, being corrected, becomes a corrected tracking error signal F. The corrected tracking error signal F thus corrected by the tracking correction apparatus 10 is fed back to the optical head 9, thereby causing the tracking operation to be carried out.

Note that a tracking correction apparatus 20 which has an adder 25 (signal detecting means) in addition to the arrangement of the tracking correction apparatus 10 (see FIG. 5) may be substituted for the tracking correction apparatus 10. To be more specific, the detection signal C from the two-division photodetector 7 is sent to one of the input terminals of the adder 25, while the detection signal D to the other input terminal. The output of the adder 25 is sent to the A/D converter 12, i.e., the A/D converter 12 and the adder 11 are not connected with each other.

With such an arrangement, the detection signals C and D of the two-division photodetector 7 are respectively sent to the differential amplifier 8, where the tracking error signal E is generated. The tracking error signal E is sent to the adder 11 for the tracking correction operation. Here, the detection signals C and D are also sent to the adder 25 for addition, and the added result is outputted as a total signal L. The wabble signal contained in the total signal L is converted into a digital signal M by the A/D converter 12 in synchronization with the timing clock K. Then, as in the operation conducted by the tracking correction apparatus 10, the wabble signals $E_1$ and $E_2$ in the respective first and second regions X and Y are compared by the CPU 13. A correction signal H according to the difference or the ratio thus found in the comparing operation is sent to the D/A converter 14 which outputs the correction signal I to the adder 11. The adder 11 adds the tracking error signal E and the correction signal I to obtain the corrected tracking error signal F.

A tracking correction apparatus 30 may be substituted for the tracking correction apparatus 10. In comparison with the tracking correction apparatus 10, the tracking correction apparatus 30 has an envelope detector 35 in the place of the comparator 15 and the PLL circuit 16 (see FIG. 6). More specifically, the output terminal of the adder 11 is connected to the input terminal of the envelope detector 35, and the output terminal of the envelope detector 35 is connected to the input terminal of the A/D converter 12. The envelope detector 35 is for detecting envelopes which are curves linking the peaks of the waveform of the wabble signal. The detector 35 detects amplitude, i.e. a difference between a peak value and a bottom value of the waveform.

With such an arrangement, the detection signals C and D from the two-division photodetector 7 are sent to the differential amplifier 8, where a tracking error signal E is generated. The tracking error signal E is sent to the adder 11, for a tracking correction operation. The output of the adder 11 is sent to the envelope detector 35, which detects the amplitude of the wabble signal contained in the tracking error signal E and outputs the detected amplitude as an amplitude detection signal N. The amplitude detection signal N is converted by the A/D converter 12 into a digital signal G. Then, as in the operation conducted by the tracking correction apparatus 10, the wabble signals $E_1$ and $E_2$ in the respective first and second regions X and Y are compared by the CPU 13. A correction value H according to the difference or the ratio thus found in the comparing operation is sent to the D/A converter 14 which outputs the correction signal I to the adder 11. The adder 11 adds the tracking error signal E and the correction signal I, to obtain the corrected tracking error signal F with which the tracking correction operation is conducted.

Since the amplitude detection signal N is obtained by the envelope detector 35, the timing clock K synchronizing with the wabble signal is not required. Accordingly, the structure is simplified in comparison with the tracking correction apparatus 10.

Figure 7:
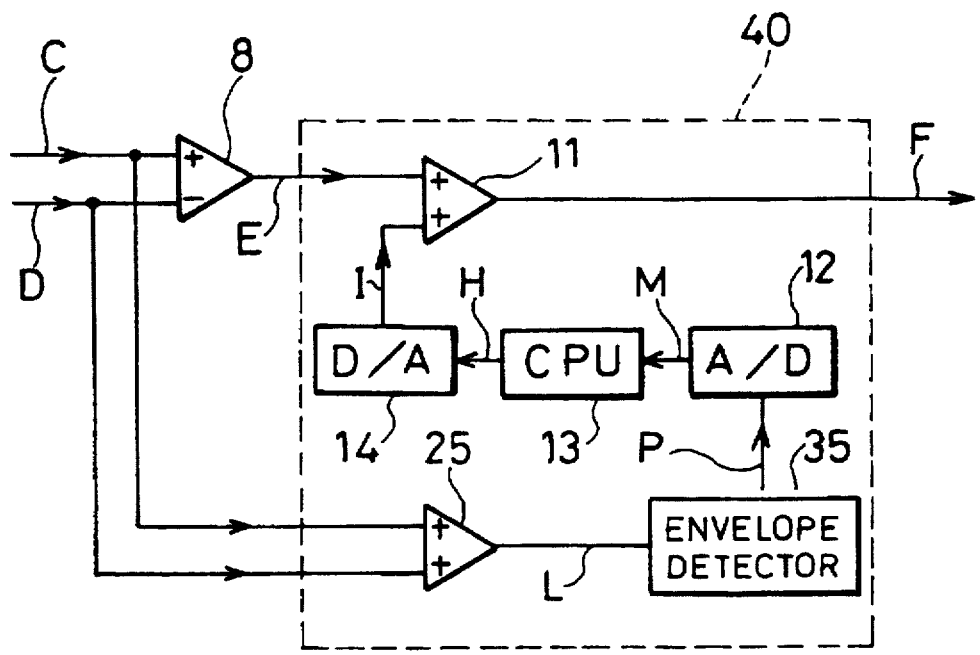
FIG. 7 is a view illustrating another arrangement of the tracking correction apparatus.

Further a tracking correction apparatus 40 may be substituted for the tracking correction apparatus 20. In comparison with the arrangement of the tracking correction apparatus 20, the tracking correction apparatus 40, as shown in FIG. 7, has such an arrangement in which the comparator 15 and the PLL circuit 16 are omitted and an envelope detector 35 is connected between the adder 25 and the A/D converter 12. Specifically, the output terminal of the adder 25 is connected to the input terminal of the envelope detector 35, while the output terminal of the envelope detector 35 is connected to the input terminal of the A/D converter 12.

With the above arrangement, the detection signals C and D are sent to the adder 25 for addition, and the added result is outputted as a total signal L. Amplitude of the wabble signal contained in the total signal L is detected by the envelope detector 35, and a detected amplitude detection signal P is converted into a digital signal M by the A/D converter 12. Then, as in the operation conducted by the tracking correction apparatus 20, the wabble signals $E_1$ and $E_2$ in the respective first and the second regions X and Y are compared by the CPU 13. A correction value H according to the difference or the ratio thus found in the comparing operation is sent to the D/A converter 14 which outputs the correction signal I to the adder 11. The adder 11 adds the tracking error signal E and the correction signal I, to obtain the corrected tracking error signal F with which the tracking correction operation is conducted.

Since the tracking correction apparatuses 10, 20, 30, and 40 respectively adopt a digital arithmetic unit such as the CPU 13, it is possible to automatically correct a tracking operation even when the tracking operation is affected by the exchange of optical information recording media or a change in ambient temperature.

Figure 8:
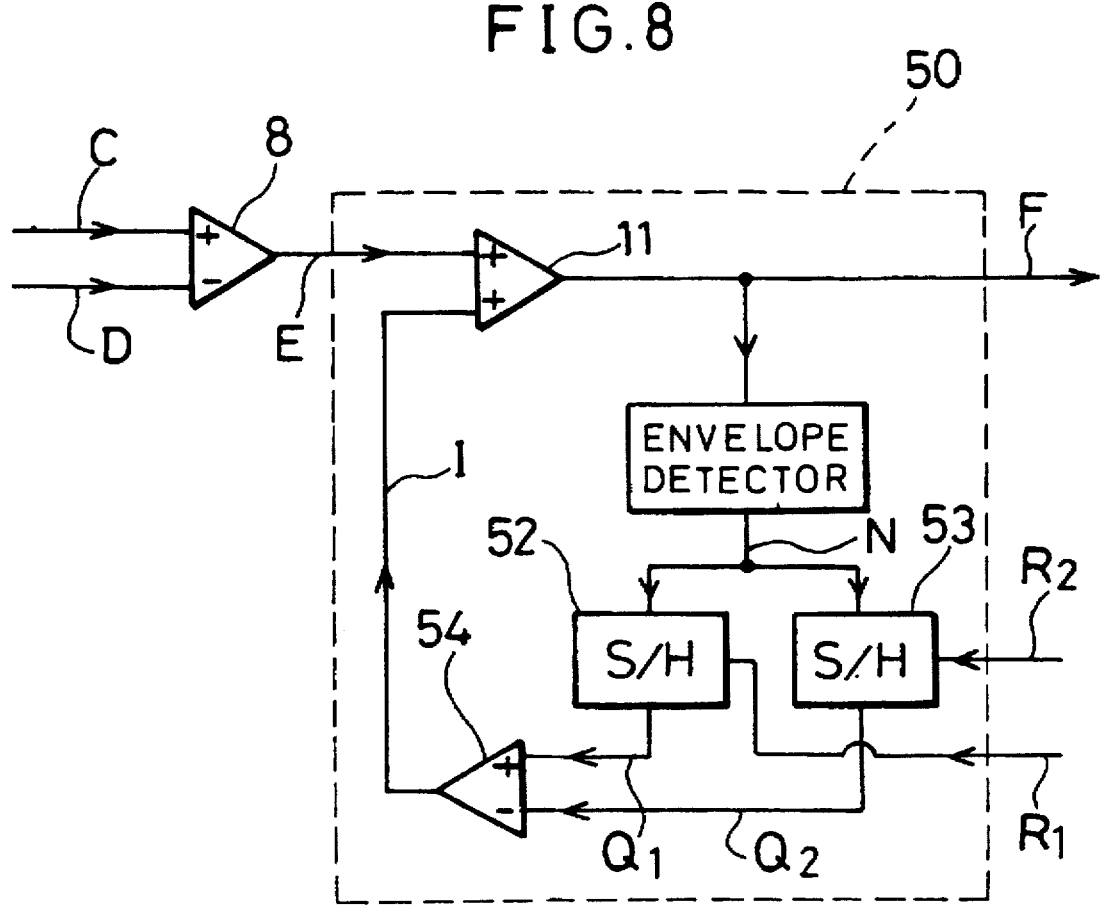
FIG. 8 is a view illustrating another arrangement of the tracking correction apparatus.

The following description shows an example of a tracking correction apparatus without the CPU 13. As FIG. 8 illustrates, the tracking correction apparatus 50 is composed of an adder 11, an envelope detector 35, two sample/hold (S/H) circuits 52 and 53, and a subtracter 54. To be more detailed, an output terminal of the adder 11 is connected to the input terminal of the envelope detector 35, while the output terminal of the envelope detector 35 is connected to the input terminal of the S/H circuits 52 and 53 respectively. The output terminal of the S/H circuit 52 is connected with a positive input terminal of the subtracter 54, while the output terminal of the S/H circuit 53 is connected with a negative input terminal of the subtracter 54. An output terminal of the subtracter 54 is connected with one of the input terminals of the adder 11.

With such an arrangement, the envelope detector 35 detects an amplitude detection signal N in response to the adder 11, and the amplitude detection signal N is sent to the S/H circuits 52 and 53 respectively. The S/H circuit 52 holds a wabble signal amplitude $Q_1$ derived from the first region X in accordance with a timing signal $R_1$, while the S/H circuit 53 holds a wabble signal amplitude $Q_2$ derived from the second region Y in accordance with a timing signal $R_2$. The wabble signal amplitude $Q_1$ and $Q_2$ thus held are simultaneously sent to the subtracter 54, where a correction signal I is generated in accordance with the subtracting result. The correction signal I is added to the tracking error signal E in the adder 11. Therefore, a correcting operation is conducted if the wabble signal amplitude $Q_1$ derived from the first region X and the wabble signal amplitude $Q_2$ derived from the second region Y are different, while the correcting operation is not conducted if the wabble signal amplitude $Q_1$ and $Q_2$ are substantially equal. Thus, the tracking correction operation is automatically conducted without the CPU 13. Note that the tracking correction apparatus 50 may be arranged so that the wabble signal contained in the total signal is used, whereas the above arrangement employs the wabble signal contained in the tracking error signal.

Though the "push-pull" amplification method is adopted as a tracking method according to the foregoing tracking correction apparatus, other method such as a three-spots method may be employed. Since it is possible to obtain a wabble signal when adopting the three-spots method, a tracking correction operation can be conducted in the same manner as that mentioned above.

The total signal is an addition of output signals from a servo-use division-type light-receiving element (the two-division photodetector in the present embodiment), but an output signal from a light-receiving element for an RF signal-use (a reproducing data signal) may be substituted for the total signal, as being substantially the same as the total signal.

Figure 9:
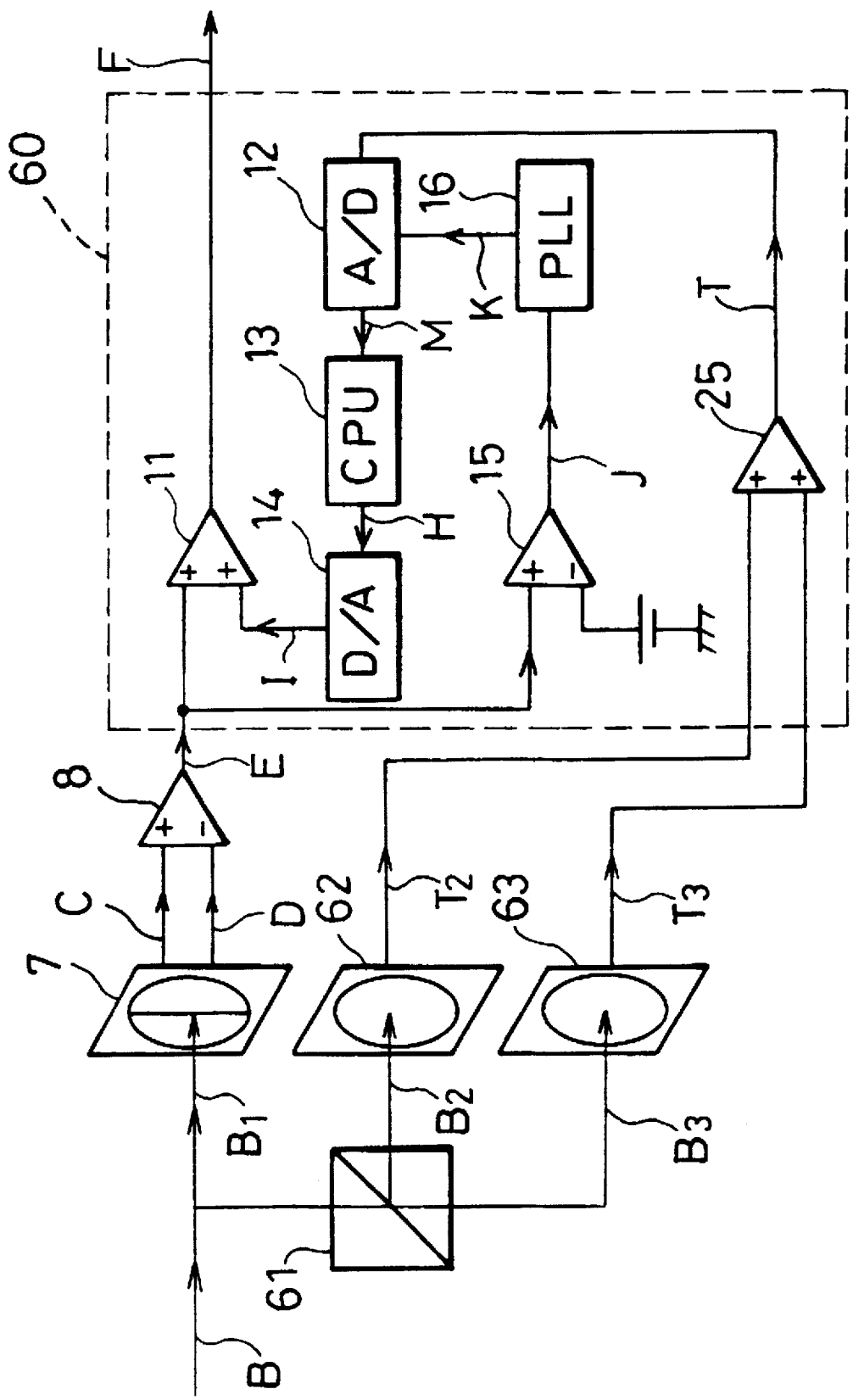
FIG. 9 is a view illustrating an arrangement wherein the tracking correction apparatus of FIG. 5 is adopted to an magneto-optical recording-reproducing apparatus.

The foregoing tracking correction apparatuses may be adopted to an magneto-optical recording-reproducing apparatus. FIG. 9 illustrates an example in which adopted is a tracking correction apparatus 60 which has the same structure as that of the tracking correction apparatus 20. Note that the magneto-optical recording-reproducing apparatus is provided with photodetectors 62 and 63 for reproducing data signals, as well as a two-division photodetector 7 for a tracking servo-use.

With such an arrangement, the light B reflected from the magneto-optical recording medium is divided by optical means such as a beam splitter (not shown) into two, that is, reflected light $B_1$ which is directed to the two-division photodetector 7 and a reflected light which is directed to a polarizing beam splitter 61. The reflected light directed to the polarizing beam splitter 61 is further divided into two polarized light components $B_2$ and $B_3$ in two polarization directions respectively. The components $B_2$ and $B_3$ are directed to the photodetectors 62 and 63 respectively. The polarized light component $B_2$ is converted into a reproduction signal $T_2$ by the photodetector 62, while the polarized light component $B_3$ is converted into a reproduction signal $T_3$ by the photodetector 63. The reproduction signals $T_2$ and $T_3$ are added by the adder 25, thereby obtaining an addition signal T. The addition signal T, which is equivalent to the total signal L, is sent to the A/D converter 12. The following process is the same as that of the tracking correction apparatus 20. Namely, the correction signal I is added to the tracking error signal E, so that the tracking correcting operation is carried out.

[Second Embodiment]

The following description will discuss the second embodiment of the present invention. The members having the same structure (function) as those in the first embodiment will be designated by the same reference numerals and their description will be omitted.

As is the case with an optical disk employed in the first embodiment, an optical disk employed in the present embodiment has a tracking correction region which doesn't share any part with a data recording region. In the data recording region, a side wall of a groove is wabbled so that address information is obtained like the case of FIG. 1. The data recording region is used as the second region Y, while the tracking correction region as the first region X. Note that it is possible that the first region X is used as the data recording region while the second region Y as the tracking correction region.

With such an arrangement, first, amplitude of the wabble signal derived from the first region X is detected in the tracking correction region, and next, an amplitude of the wabble signal derived from the second region Y is detected in the data recording region. If the difference or ratio between the respective detected amplitude are substantially equal, the tracking correction ends, whereas if not equal, the tracking correcting operation is repeated after jumping onto the tracking correction region.

Therefore, the correcting operation is quickened, since unnecessary moving actions of the light beam are omitted, thereby causing reduction in the time required for the tracking correction. Moreover, since the second region (or the first region) is also utilized as the data recording region, the capacity of an optical disk is made an effective use of.

[Third Embodiment]

The following description will discuss the third embodiment of the present invention, referring to FIG. 15. The members having the same structure (function) as those in the first and second embodiments will be designated by the same reference numerals and their description will be omitted.

Like the first embodiment, an optical disk employed in the present embodiment has a data recording region and a tracking correction region. The tracking correction region is composed of two tracks, assuming that one track is defined as the track which corresponds to one rotation of the optical disk. Within one track, the first and the second regions X and Y are alternately provided as shown in FIG. 15(a).

By setting the wabble signal frequency band in the first and second regions X and Y so as not to be coincident with the data signal frequency band, it is also possible to record the data signal on the first and second regions X and Y.

As FIG. 15(b) illustrates, another arrangement may be adopted, wherein the first region X, the second region Y, and the data recording region Z are repeatedly provided in this order in one track, without a specific tracking correction region.

Note that FIG. 15 shows that the first track starts at around the left end of the line and ends at around a midpoint, and a second track starts at around the mid-point and ends at the right end.

The following description will explain how a tracking correcting operation is carried out when such an optical disk as mentioned above is used, referring to FIG. 13 which was used for an explanation of the first embodiment. First, the tracking correcting operation starts (S11). The step S12 is not required, because every track has the first and the second regions X and Y in accordance with the above optical disk. The following process is the same as that of the first embodiment. An amplitude $V_1$ of the wabble signal $E_1$ contained in the tracking error signal E is detected (S13). Then, the amplitude $V_2$ of the wabble signal $E_2$ contained in the tracking error signal E are detected (S14). Comparison between the amplitude $V_1$ and $V_2$ of the respective wabble signals is carried out to judge whether they are substantially equal or not (S15). If it is judged in S15 that the amplitude are not equal, a correction voltage is added to the tracking error signal E and the flow goes back to the start of the correcting operation (S16). On the other hand, if it is judged in S15 that the two amplitude are substantially equal, the correcting operation ends (S17).

The correcting operation is repeated in this way until amplitude of the wabble signals in the respective first and second regions X and Y are substantially equal, thereby leading the tracking position of the light beam onto the track center. In addition, since the first region X and the second region Y are alternately provided, only rotation of the optical disk, without a move of the light head, is required so as to repeat the correcting operation. Accordingly, it is possible to conduct a precise tracking correction operation within a short time.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for carrying out a tracking correction So that a light beam, projected onto a track of an optical recording medium, does not deviate from the center of the track,
    the track having first and second regions, the first region having a first side wall of a groove, the first side wall being wabbled at a frequency not falling within a tracking servo frequency band, the second region having a second side wall of a groove, the second side wall being wabbled at a frequency not falling within the tracking servo frequency band, the first side wall being opposite to the second side wall, said method comprising of the steps of:
        obtaining first amplitude of a wabble signal which is obtained in accordance with a tracking of the light beam with respect to the first region;
        obtaining second amplitude of a wabble signal which is in accordance with a tracking of the light beam with respect to the second region;
        producing a correction signal, in accordance with comparison of the first and the second amplitude; and
        moving the light beam in response to the correction signal, so that the first amplitude becomes substantially equal to the second amplitude.

2. The method as set forth in claim 1, wherein the optical recording medium has a data recording region and a tracking correction region, the data recording region having recording tracks on which data is recorded, the tracking correction region having tracks other than the recording tracks, the first and the second regions being provided in the tracking correction region, further comprising the step of:
    moving the light beam to the tracking correction region before projecting the light beam onto the data recording region.

3. The tracking correction method as set forth in claim 1, wherein the second region is a data recording region having recording tracks on which data is recorded, and the first region is a tracking correction region having tracks other than the recording tracks, further comprising the step of:
    moving the light beam to the tracking correction region before projecting the light beam onto the data recording region.

4. An apparatus for carrying out a tracking correction so that a light beam, projected onto a track of an optical recording medium, does not deviate from the center of the track,
    the track having first and second regions, the first region having a first side wall of a groove, the first side wall being wabbled at a frequency not falling within a tracking servo frequency band, the second region having a second side wall of a groove, the second side wall being wabbled at a frequency not falling within the tracking servo frequency band, the first side wall being opposite to the second side wall, said apparatus comprising:
    signal detecting means for outputting a tracking error signal during a tracking of the light beam with respect to the optical recording medium;
    amplitude detecting means for detecting amplitude of a wabble signal in the tracking error signal;
    comparing means for comparing first amplitude of the wabble signal derived from the first region and second amplitude of the wabble signal derived from the second region; and
    correcting means for correcting the tracking error signal in response to said comparing means so that the first and second amplitude are substantially equal.

5. The tracking correction apparatus as set forth in claim 4, wherein said correcting means includes adding means for adding the tracking error signal and a correction signal generated based on an output signal of said comparing means.

6. The tracking correction apparatus as set forth in claim 4, wherein:
    said amplitude detecting means outputs amplitude in a digital form; and
    said comparing means includes digital-processing means for digitally comparing the amplitude.

7. The tracking correction apparatus as set forth in claim 4, wherein said amplitude detecting means includes:
    clock generating means for generating a timing clock synchronizing with respective peaks and bottoms of the wabble signal which is an analog signal; and
    converting means for detecting each peak and bottom of the wabble signal in synchronization with the timing clock, and for converting a difference between the detected peak and bottom into a digital signal.

8. The tracking correction apparatus as set forth in claim 4, wherein said amplitude detecting means includes envelope detecting means for detecting envelope which is found by linking peaks of a waveform of the wabble signal, so as to detect the amplitude of the wabble signal.

9. The tracking correction apparatus as set forth in claim 4, wherein:

said amplitude detecting means includes (1) envelope detecting means for detecting envelope which is found by linking peaks of a waveform of the wabble signal so as to detect the amplitude of the wabble signal, (2) first sample/hold means for holding for a predetermined period the first amplitude of the wabble signal derived from the first region, and (3) second sample/hold means for holding for a predetermined period the second amplitude of the wabble signal derived from the second region, and said comparing means includes subtracting means for performing the subtraction between the first amplitude and the second amplitude, the first and the second amplitude being input simultaneously.

10. An apparatus for carrying out a tracking correction so that a light beam, projected onto a track of an optical recording medium, does not deviate from the center of the track, the track having first and second regions, the first region having a first side wall of a groove, the first side wall being wabbled at a frequency not falling within a tracking servo frequency band, the second region having a second side wall of a groove, the second side wall being wabbled at a frequency not falling within the tracking servo frequency band, the first side wall being opposite to the second side wall, said apparatus comprising:

first signal detecting means for outputting a tracking error signal during tracking of a light beam with respect to the optical recording medium;

second signal detecting means for summing up all received light amount, and for converting the light amount into an electric signal which is outputted as a total signal;

amplitude detecting means for detecting amplitude of a wabble signal in the total signal;

comparing means for comparing first amplitude of the wabble signal derived from the first region and second amplitude of the wabble signal derived from the second region; and correcting means for correcting the tracking error signal in response to said comparing means so that the first and the second amplitude are substantially equal.

11. The tracking correction apparatus as set forth in claim 10, wherein said correcting means includes adding means for adding the tracking error signal and a correction signal generated based on an output signal of said comparing means.

12. The tracking correction apparatus as set forth in claim 10, wherein:

said amplitude detecting means outputs amplitude in a digital form; and said comparing means includes digital-processing means for digitally comparing the amplitude.

13. The tracking correction apparatus as set forth in claim 10, wherein said amplitude detecting means includes:

clock generating means for generating a timing clock synchronizing with respective peaks and bottoms of the wabble signal which is an analog signal; and converting means for detecting each peak and bottom of the wabble signal in synchronization with the timing clock, and for converting a difference between the detected peak and bottom into a digital signal.

14. The tracking correction apparatus as set forth in claim 10, wherein said amplitude detecting means includes envelope detecting means for detecting envelope which is found by linking peaks of a waveform of the wabble signal, so as to detect the amplitude of the wabble signal.

15. The tracking correction apparatus as set forth in claim 10, wherein:

said amplitude detecting means includes (1) envelope detecting means for detecting envelope which is found by linking peaks of a waveform of the wabble signal so as to detect the amplitude of the wabble signal, (2) first sample/hold means for holding for a predetermined period the first amplitude of the wabble signal derived from the first region, and (3) second sample/hold means for holding for a predetermined period the second amplitude of the wabble signal derived from the second region, and said comparing means includes subtracting means for performing the subtraction between the first amplitude and the second amplitude, the first and the second amplitude being inputted simultaneously.

16. An optical disk, comprising first and second regions, the first region having a first side wall of a groove, the first side wall being wabbled at a frequency not falling within a tracking servo frequency band, the second region having a second side wall of a groove, the second side wall being wabbled at a frequency not falling within the tracking servo frequency band, the first side wall being opposite to the second side wall.

17. The optical disk as set forth in claim 16, further comprising a data recording region and a tracking correction region, the data recording region having recording tracks on which data is recorded, the tracking correction region having tracks other than the recording tracks, the first and the second regions being provided in the tracking correction region.

18. The optical disk as set forth in claim 17, wherein the tracking correction region is composed of two tracks, one forming the first region and the other forming the second region, said one track being defined as a track corresponding to one rotation of the optical disk.

19. The optical disk as set forth in claim 17, wherein the first and second regions are alternately provided within one track in the tracking correction region, said one track being defined as a track corresponding to one rotation of the optical disk.

20. The optical disk as set forth in claim 16, wherein the second region is a data recording region having recording tracks on which data is recorded, and the first region is a tracking correction region having tracks other than the recording tracks.

21. The optical disk as set forth in claim 16, wherein a data recording region for recording data, the first region, and the second region are provided within one track in this order repeatedly, said one track being defined as a track corresponding to one rotation of the optical disk.

* * * * *